Sept. 1, 1959　　　　　H. W. ROCKWELL　　　　　2,902,007
CYLINDER PISTON ASSEMBLY WITH PRESSURE RELIEVING MEANS
Filed May 31, 1957　　　　　　　　　　　　　　2 Sheets-Sheet 2

Inventor
Harvey W. Rockwell
By Henry J. Marciniak
Attorney

United States Patent Office 2,902,007
Patented Sept. 1, 1959

2,902,007

CYLINDER PISTON ASSEMBLY WITH PRESSURE RELIEVING MEANS

Harvey W. Rockwell, Cedar Rapids, Iowa, assignor to Allis-Chalmers Manufacturing Company, Milwaukee, Wis.

Application May 31, 1957, Serial No. 662,899

10 Claims. (Cl. 121—38)

This invention relates to pressure fluid motors of the cylinder and piston type and particularly to pressure relieving means for such fluid motors.

In particular applications of fluid motors of the piston and cylinder type it is frequently desirable to preset the valve controlling the piston travel in a given direction so that when the piston reaches the end of its travel the pressure built up in the cylinder can be automatically relieved without causing an excessive temperature rise of the pressure fluid. As an example, the fluid motor used to operate the ejector of a motor scraper may be required to retract the ejector to its loading position in a very short interval of time. Thus, when a motor scraper is used for short hauling and frequent loading, the operator's complete attention may be required for steering, shifting gears and maneuvering the scraper into position to dig a new load. The fluid motor actuating the ejector must therefore be operated in a manner that requires a minimum amount of attention on the part of the operator.

If the control valve operating the fluid motor is provided with a detent position, the operator need only to place the valve in this position. The jack will then retract the ejector until it is returned to the loading position which occurs near the end of the piston stroke. If the fluid force at the end of the piston stroke is not effectively relieved, possible damage to the scraper structure may result. It is desirable to provide some means to relieve automatically this fluid force which has caused the movement of the ejector. To require that the operator closely watch the return movement of the ejector during the return cycle of the earth moving operation and operate a control valve at the particular time that this ejector reaches the loading position, would interfere with the overall efficiency of a short hauling operation.

A conventional spring loaded relief valve installed in the pressure side of the system normally prevents the fluid pressure from becoming excessive. However, this type of relief valve is primarily a safety device and not intended for normal operational use in the system. Due to the restriction to flow maintained by the force of the spring when the valve is in the open position, the spring loaded relief valve causes the hydraulic fluid to heat very rapidly. Overheating of the fluid in the system results in erratic operation. It is desirable that the pressure relieving means which is to be employed in routine operations of a pressure fluid system offer minimum restriction to the passage of the fluid in order to reduce the frictional resistance and prevent overheating of the fluid.

Near the end of the completion of the piston stroke used to return the ejector to the loading position, it is necessary that the inertia of the mechanical system be overcome. This requires that the masses involved in the movement of the ejector be decelerated rapidly. The pressure relieving means should readily permit the timing of the deceleration to be such that the masses involved will be in a predetermined location when the piston is near the end of its stroke and the cylinder is collapsed. Thus, it is desirable that the pressure be relieved automatically at the proper time as the piston reaches a specific point of travel near the end of its stroke to provide a hydraulic cushion for the decelerating forces.

After the pressure relieving means comes into operation, it should be possible to readily cut it off. If the operator desires to reverse the direction of travel of the piston when it has engaged the pressure relieving means, moving the control valve to the position for actuating the piston in the reverse direction should automatically accomplish this movement. Thus, it is desirable that the pressure relieving means automatically close when pressure fluid is admitted to the cylinder to move the piston in a reverse direction.

Accordingly, it is a principal object of this invention to provide a fluid motor of the cylinder and piston type having pressure relieving means operable only when the piston reaches a predetermined point of travel.

It is also an object of this invention to provide a pressure fluid cylinder and piston having a pressure relieving means whereby the actuation of the pressure relieving means can be readily timed with deceleration of the masses acting or being acted upon by the piston.

It is another object of this invention to provide a fluid pressure relieving means that will permit fluid pressure to be bypassed around the piston when the piston reaches a predetermined position in the cylinder and at no other position of the piston with respect to the cylinder.

It is a further object of this invention to provide a pressure fluid relieving means which will permit fluid to bypass said piston when it reaches a predetermined position with respect to said cylinder with a minimum frictional resistance to prevent overheating of the pressure fluid.

A still further object of this invention is to provide a fluid pressure relieving means that will automatically stop relieving the fluid pressure on the pressure side of the piston when power fluid is admitted to the low pressure side of the piston.

It is a more general object of this invention to provide an improved fluid motor of the piston and cylinder type incorporating the hereinbefore outlined requirements.

Other objects and advantages of this invention are made apparent in the following specifications by reference to the accompanying drawings, wherein.

Figure 1:
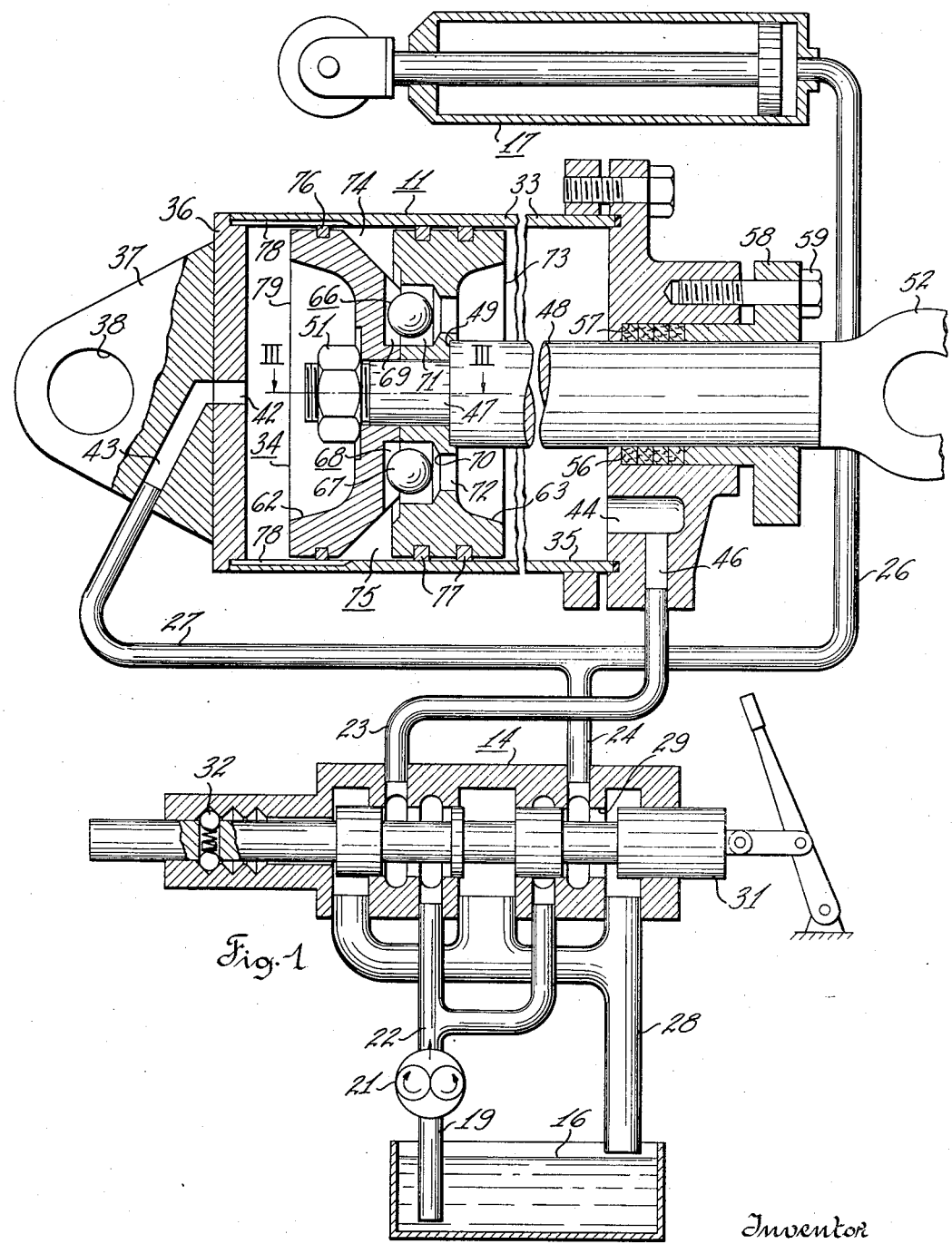
Fig. 1 is a sectional view of a pressure fluid cylinder and piston incorporating features of this invention and showing schematically a hydraulic circuit in which it can be used.
Figure 2:
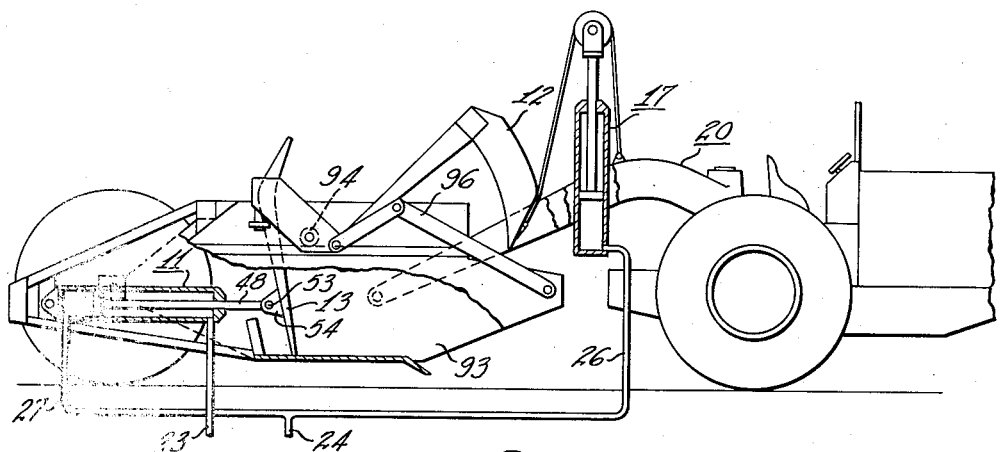
Fig. 2 shows schematically the manner in which the cylinder may be used in conjunction with a single acting cylinder to operate the apron and ejector of a motor scraper.

Referring to Fig. 1 and Fig. 2, a pressure fluid motor 11 which is the subject of the applicant's invention is shown in a hydraulic circuit used to operate an apron 12 and ejector 13 in a conventional motor scraper 20. An open center spool type of control valve 14 is schematically shown directing the flow of pressure fluid from the reservoir 16 to a conventional single acting fluid motor 17 and to the double acting fluid motor 11 in which the present invention is embodied. The reservoir 16 is connected by a suction conduit 19 to a pump 21 adapted to be driven from the engine of the motor scraper 20. A pump 21 is connected by a discharge conduit 22 to the control valve 14. Two cylinder conduits 23, 24 conduct fluid to and from the fluid motors 17, 11. The first cylinder conduit 23 connects the control valve 14 with one end of the double acting fluid motor 11 and the second cylinder conduit 24 connects the control valve 14 with the single acting fluid motor 17 and the other end of the double acting fluid motor 11 through branches 26 and 27, respectively. A return line 28 also connects the control valve 14 with the reservoir 16.

The control valve 14 is provided with a centrally disposed bore 29 and the conduits 22, 23, 24, 28 connecting with the valve are in free communication with the bore 29 so that the direction of the fluid flow through the valve 14 can be controlled by the axial position of a valve spool 31. A detent means 32 at the end of the valve spool 31 detains the spool in the "ejector return" position, in which the valve spool 31 is shown in Fig. 1. In this position pressure fluid is directed into the cylinder conduit 23 and admitted to the one end of the fluid motor 11.

The fluid motor 11 comprises a hydraulic cylinder 33 having a piston 34 slidably disposed within a cylinder wall 35 and adapted to be reciprocated by alternate introduction of fluid at opposite ends of the cylinder 33. In the preferred embodiment of the invention, the hydraulic cylinder 33 is double acting, although the invention is also adaptable to a single acting cylinder. The cylinder 33, as shown in Fig. 1, is closed at its left end by a cylinder head 36. The head 36 has a projecting pad 37 welded to it and contains an eye 38 for anchoring the cylinder 33 to a suitable support.

Suitable fluid connections for supplying and exhausting fluid from either end of the cylinder 33 are provided. A port 42 in the cylinder head 36 is joined by a passage 43 which connects with the branch 27 of the cylinder conduit 24. At the right end a port 44 joins with a passage 46 which connects with the cylinder conduit 23. Normally, the fluid passages 43, 46 are open, so that by supplying pressure fluid to the branch 27 and exhausting fluid through port 44, the piston 34 is moved from left to right, as viewed in Fig. 1. When pressure fluid is supplied to port 44 and is exhausted from port 42, the piston 34 is moved from right to left. Whether pressure fluid is admitted through port 42 or port 44 depends upon the position of the valve spool 31 in the control valve 14. In the "ejector return" position shown in Fig. 1, the control valve 14 will permit pressure fluid to enter the cylinder 33 through port 44 and exhaust fluid to leave through port 42.

The piston 34 is mounted on a reduced portion 47 at one end of a piston rod 48 and held against a shoulder 49 by a hexagonal lock nut 51. At the other end of the piston rod 48 an eye 52 is provided to pivotally connect the rod 48 by means of a pin 53 to a clevis 54 extending from the ejector 13, as shown in Fig. 2. The piston rod 48 extends through a packing seal 56 that is retained in a bore 57 by the packing gland 58 which is secured to the cylinder 33 by four cap screws 59.

The term "piston," as it is used herein, includes the assembly of the parts reciprocably associated with the cylinder 33, exclusive of the piston rod 48. In the descriptive portion of this application, the term "piston" is used in interest of brevity, whereas the more exact descriptive phrase, "piston assembly," is used in the claims. Both expressions, as used herein, identify an assembly comprising a first section 62, a second section 63, a pair of plunger actuated type of valves 64 and a pair of ball and flute valves 66.

The two sections 62, 63 are rigidly held against axial separation by the lock nut 51 and form an easily assembled housing for the valves 64, 66. In the ball and flute type of valve 66 a steel ball 67 is retained in an individual ball cage 68 formed by mating recesses 69, 71 machined in the two sections 62, 63, respectively. One side of the ball cage 68 communicates with a pressure side of the piston 34 through a passage 72 in the second section 63.

The passage 72 is formed to provide a valve seat 70 for the ball 67 and communicates with the side 73 from which the piston rod 48 extends and which hereinafter shall be referred to as the rod side 73. Another side of the ball cage 68 communicates with a passage 74 machined in the first section 62. The passage 74 is normally sealed by means of a piston ring 76 in the first section 62 and the piston rings 77 in the second section 63. The passages 72 and 74 combine with the annular space formed by section 62 and 63 to form a relief passage 75 in the piston 34.

The seal formed by the piston ring 76 is broken when the piston ring 76 comes in contact with a series of four longitudinally disposed and circumferentially spaced flutes machined on the cylinder wall 35. The four flutes 78 form a bypass connection around the piston ring 76 and allow hydraulic fluid to pass from passage 72 to another pressure side 79 of the piston 34, which shall hereafter be referred to as the head side 79.

Figure 3:
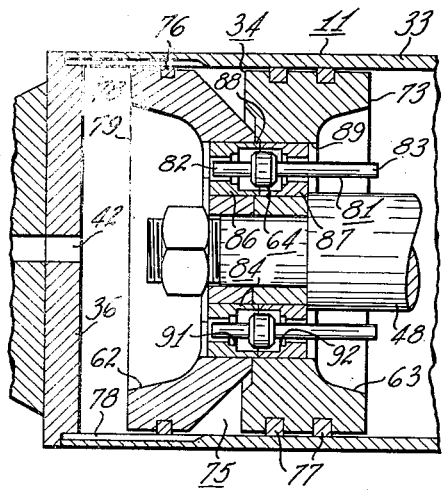
Fig. 3 is a cross section taken in the plane III—III of Fig. 1.

Referring to Fig. 3, the two plunger actuated valves 64 installed in the piston 34 are well known in the art. A plunger 81 is provided with a short stem 82 and a long stem 83. The plunger 81 is centrally mounted for free reciprocation in a valve body 84. The valve body 84 is fabricated in two parts 86, 87. The first part 86 fits into the first section 62 and has a portion 88 overlapping into the second section 63 to provide a seal. A bore 89 provided in the second section 63 receives the second part 87 of the plunger valve body 84. A valve seat 91 is formed in part 86 and a valve seat 92 is formed in part 87. The plunger 81 will be seated against the valve seat 91 when the pressure on the rod side 73 of the piston 34 exceeds the pressure on the head side 79. When the pressure on the head side 79 exceeds the pressure on the rod side 73, the plunger 81 will be seated against the seat 92.

The two plunger actuated valves 64 are provided to protect the fluid motor 11 against overtravel of the piston 34 in a longitudinal direction to the right. When the piston 34 is at a point near the end of its stroke to the right, further travel of the piston 34 will cause the end of the elongated plunger stem 83 to come in contact with the cylinder 33 causing the plunger 81 to be unseated from the valve seat 92.

Referring to Fig. 2, an extension of the piston rod 48 causes the ejector 13 to expel the load in a scraper bowl 93. The ejector 13 rides on the rollers 94 and is mechanically linked by the linkage 96 with the apron 12. The movement of the ejector 13 generally causes the apron 12 to be lifted. A portion of the apron lift is accomplished by the single acting hydraulic motor 17. A retraction of the piston rod 48 causes the ejector 13 to move in a rearward direction and also to lower the apron 12 from an elevated position. During the latter part of its return travel the ejector 13 is assisted by the weight of the apron 12. Thus, both the forces of gravity and the hydraulic forces exerted upon the piston 34 tend to return the ejector 13 to its initial loading position. Also, the travel of the piston relative to the cylinder is accelerated by these forces. As a consequence, the pressure on the head side 79 of the piston 34 increases and the pressure on the rod side 73 increases inasmuch as the delivery volume of the pump 21 remains the same.

The ball and flute valves 66 automatically relieve this buildup of pressure when the piston 34 reaches a predetermined point of travel with respect to the cylinder wall 35. This point is determined by the length of the four flutes 78 machined on the cylinder wall 35.

From a structural safety standpoint the design of the structure surrounding the hydraulic cylinder 33 must be so controlled that the piston 34 will never contact the base of the cylinder head 36 and the nut 51 must never close the fluid passage 43. In the present installation, the closest approach of the piston 34 and the nut 51 to the head 36 is ¾". By simply lengthening the flutes 78 in the cylinder wall 35 the necessary allowance can be made for considerable variation which may occur in the fabrication of a scraper structure or during its service life. To provide a comparable allowance in a plunger actuated type of valve would necessitate using an extremely long plunger and a greater free travel distance for the plunger in the plunger valve body. The increased plunger weight and free travel distance would cause an excessive impact load on the plunger seats when the plunger is moved from one seat to another by the reversal of hydraulic fluid force.

It is to be noted that the ball 67 is not held in its seating position by a biasing spring means. The ball 67 is guided entirely by the configuration of the cage 68 formed by the recesses 69, 71 in the two piston sections 62, 63. A light retaining spring might be used in some applications without appreciably increasing the resistance to flow. However, a spring loaded relief valve would be objectionable because of the restriction to flow continually maintained by the force of the spring which would cause the hydraulic fluid to heat very rapidly. The absence of a spring or other seating force on the ball allows the pressure fluid to flow without appreciable heating.

Figure 4:
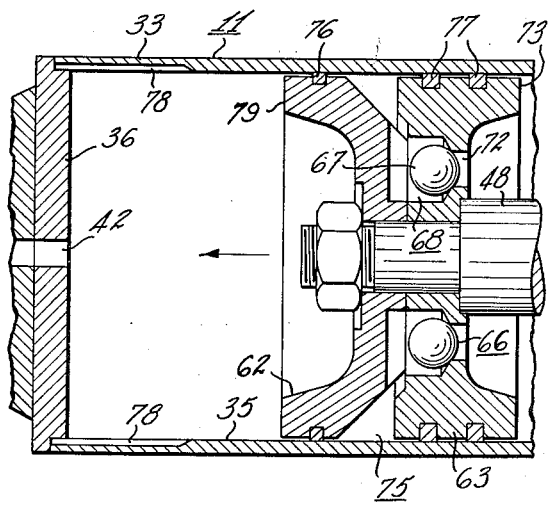
Fig. 4 is a sectional view of the piston and cylinder assembly showing the piston in a midposition of travel.

The operation of the applicant's cylinder and piston assembly is as follows:

When the piston 34, as shown in Fig. 4, is traveling to the left, fluid is being exhausted through port 42 and being admitted at the other end of the cylinder 33 to exert a hydraulic force upon the rod side 73 of the piston 34. The piston rod 48 is extended sufficiently so that the piston ring 76 is not in contact with the four flutes 78 in the cylinder wall 35. In this condition of travel the passage 72 is now sealed from the head side 79 of the piston 34 and the ball valve 66 is inoperative. Under the influence of the fluid pressure acting upon the rod side 73, the piston 34 and piston rod 48 are urged to the left. When the piston 34 has reached the position in which it is shown in Fig. 1, the piston ring 76 is in contact with the four flutes 78 of the cylinder wall 35. The flutes 78 now effectively serve as a bypass passage around the piston ring 76 and the first piston section 62.

As the piston 34 moves further to the left, the control valve remains set in the "ejector return" position, the valve spool 31 being detained by the detent means 32 in this position. High pressure hydraulic fluid continues to flow through the port 44 into the interior of the cylinder 33. The rod side 73 of the piston 34 is further acted upon by high pressure hydraulic fluid, until the piston 34 engages the flutes 78, as shown in Fig. 1. Since the piston ring 76 is now in contact with the four flutes 78 of the cylinder wall 35, the two balls 67 are now unseated and high pressure fluid is allowed to flow freely from the rod side 73 of the piston 34 through the passages 72, 74 and the flutes 78 into the cylinder 33 at the head side 79 of the piston 34. Consequently, the fluid pressure acting on either side, 73 or 79, of the piston 34 tends to be equalized and the hydraulic force exerted against the rod side 73 is relieved. Referring now to Fig. 2, because of the mechanical linkage 96 between the apron 12 and the ejector 13, the weight of the apron 12 exerts a force on the piston rod 48 tending to urge the piston 34 to the left. When the piston 34 is near the end of its stroke to the left, the hydraulic force is no longer required either to return the piston 34 or the ejector 13 to a fully retracted position. As the fluid pressure is equalized on both sides 73 and 79 of the piston 34, any further force exerted on it by the weight of the apron 12 is cushioned.

When operating conditions permit, the operator can return the valve spool 31 to a neutral or "hold" position. For this position of the valve spool 31, both cylinder conduits 23, 24 are blocked off. Pressure fluid is neither admitted to nor exhausted from the cylinder 33.

If the operator desires to extend the ejector 13 to the right from a fully retracted position as shown in Fig. 2, he shifts the valve spool 31 to a position in which pressure fluid will be admitted to the interior of the cylinder 33 through port 42. For this position of the spool 31, the passage 46 is opened to the reservoir 16. The pressure fluid admitted to the cylinder 33 at the head side 79 of the piston 34 now passes through the four flutes 78 bypassing the piston ring 76 and entering the passage 74 to react against the two balls 67. The cylinder 33 at the rod side 73 of the piston 34 being filled with low pressure hydraulic fluid, the high pressure fluid in the passage 74 seats the balls and closes the passage 72. Thus, the valve 66 functions as a check valve permitting fluid to flow only from the rod side 73 to the head side 79 of the piston 34. Hydraulic force will now be exerted against the head side 79 of the piston 34 and the piston rod 48 will be moved to the right.

Referring to Fig. 3, possible overtravel of the piston 34 to the right is prevented by a pair of conventional plunger actuated valves 64. The plunger valves 64 are lifted off their seats 92 when the end of the stem 83 contacts the right end wall of the cylinder 33. The opening of the plunger valves 64 relieves the pressure acting on the head side 79 of the piston 34. The ball and flute valves 66 remain closed while piston 34 is in this position at the right end because the ball and flute valves 66 do not come into operation unless the piston ring 76 is bypassed by the flutes 78.

By the structure disclosed and explained herein, the applicant has obtained a pressure relieving means for a fluid motor of the piston and cylinder type that effectively relieves the fluid pressure on one side of the piston at a predetermined point of travel, without extensively heating the fluid, and that provides for a high degree of safety against possible damage to structural parts to be designed into a fluid motor by readily permitting sufficient allowances for possible structural variations that may occur during manufacturing and in service to be incorporated into the structure of the cylinder and piston.

While only one particular embodiment of the applicant's invention has been described herein, it should be understood that the applicant's invention is not restricted thereto and that it is intended to cover all modifications of the invention which would be apparent to one skilled in the art and that come within the scope of the appended claims.

What is claimed is:

1. In a pressure fluid motor having a cylinder, a piston assembly axially slidable in said cylinder, a piston rod carried by the piston assembly and projecting from the end of the cylinder, said piston assembly having a head side and a rod side, and ports formed in the cylinder at opposite ends for the admission of fluid to and the discharge of fluid from the cylinder, the combination comprising: a first and a second section formed in said piston assembly and slidably disposed within said cylinder, a relief passage formed in said piston assembly between said first and said second sections and between said piston assembly and cylinder, a valve cage formed in said piston assembly and having at one end an orifice communicating with said relief passage, the other end of said valve cage presenting a valve seat and defining an orifice communicating with said rod side of said piston assembly, a valve ball positioned in said cage and sealingly engaging said valve seat, a first sealing means preventing the passage of fluid between said first section and said cylinder, a second sealing means preventing the passage of fluid between said second section and said cylinder, and a bypass connection operatively responsive to the position of said first section within said cylinder and operative to bypass said first sealing means and connect said pressure fluid on the head side of said piston assembly with said relief passage.

2. In a pressure fluid motor having a cylinder, a piston assembly axially slidably in said cylinder, a piston rod carried by the piston assembly and projecting from the end of said cylinder, said piston assembly having a head side and a rod side, and ports formed in said cylinder at opposite ends for the admission of fluid to and the discharge of fluid from said cylinder, the combination comprising: a first and a second section formed in said piston assembly and slidably disposed with respect to said cylinder, a relief passage formed in said piston assembly between said first and said second sections and between said piston assembly and cylinder, a pressure responsive valve means connecting the piston rod side of said piston assembly with said relief passage and permitting pressure fluid to flow from said rod side to said head side when fluid pressure on the rod side exceeds the pressure on the head side at a predetermined position of said piston assemblies, a first sealing means preventing the passage and permitting pressure fluid to flow from said rod side to said head side when fluid pressure on the rod side exceeds the pressure on the head side at a predetermined position of said piston assemblies of fluid between said first section and said cylinder, a second sealing means preventing the passage of fluid between said second section and said cylinder, and a bypass connection in said cylinder operative to bypass said first sealing means and connect said pressure fluid on the head side of said piston assembly with said relief passage at said predetermined position of said piston assembly.

3. In a pressure fluid motor having a cylinder, a piston assembly axially slidable in said cylinder, a piston rod carried by the piston assembly and projecting from the end of said cylinder, said piston assembly having a head side and a rod side, and ports formed in said cylinder at opposite ends for the admission of fluid to and the discharge of fluid from the cylinder, the combination comprising: a first sealing means interposed between said piston assembly and the interior of the cylinder, a second sealing means axially spaced from said first sealing means and interposed between said piston assembly and the interior of the cylinder, a passage formed in said piston assembly and communicating at one end with the interior of said cylinder between said first and second sealing means and at the other end with the rod side of said piston assembly, a pressure responside valve means interposed in said passage and permitting pressure fluid to flow from said rod side to said head side when fluid pressure on the rod side exceeds the pressure on the head side at a predetermined position of said piston assembly, and a bypass connection operative to bypass said first sealing means and connect said pressure fluid on the head side of said piston assembly with said relief passage when said first section reaches said predetermined position in the cylinder.

4. In a pressure fluid motor having a cylinder, a piston assembly axially slidable in said cylinder, a piston rod carried by the piston assembly and projecting from the end of said cylinder, said piston assembly having a head side and a rod side, and ports formed in said cylinder at opposite ends for the admission of fluid to and the discharge of fluid from the cylinder, the combination comprising: a first sealing means interposed between said piston assembly and the interior of said cylinder, a second sealing means axially spaced from said first sealing means and interposed between said piston assembly and the interior of said cylinder, a passage formed in said piston assembly and communicating at one end with the interior of said cylinder between said first and said second sealing means and at the other end with said rod side of said piston assembly, a pressure responsive valve interposed in said passage and permitting pressure fluid to flow from said rod side to said head side when fluid pressure on the rod side exceeds the pressure on the head side at a predetermined position of said piston assembly, and a flute extending from one end of the interior of said cylinder to a predetermined point, said flute bypassing said first sealing means when said passage reaches said predetermined point within said cylinder and connects the pressure fluid acting on the head side of said piston assembly with said passage to operate said pressure responsive means.

5. In a pressure fluid motor having a cylinder, a piston assembly axially slidable in said cylinder, a piston rod carried by said piston assembly and projecting from the end of said cylinder, said piston assembly having a head side and a rod side, and ports formed in said cylinder at opposite ends for the admission of fluid to and the discharge of fluid from said cylinder, the combination comprising: a first surface on said piston assembly in sliding contact with the interior of said cylinder, a second surface on said piston assembly axially spaced from said first surface and in sliding contact with the interior of said cylinder, a first fluid sealing means interposed between said first surface of said piston assembly, a second fluid sealing means interposed between said second surface of said piston assembly and axially spaced from said first sealing means, a passage formed in said piston assembly and connecting at one end with the rod side of said piston assembly and at the other end with the interior of said wall between said first and second sealing means, bypass means connecting said passage with the pressure fluid acting on the head side of said piston assembly when said assembly reaches a predetermined point of travel in the interior of said cylinder, and check valve means in said passage permitting pressure fluid to flow from the rod side of said piston assembly to the head side through said bypass means and preventing the flow of pressure fluid from the head side of said piston assembly to the rod side.

6. In a pressure fluid motor having a cylinder, a piston assembly axially slidable in said cylinder, a piston rod carried by the piston assembly and projecting from the end of said cylinder, said piston assembly having a piston, a head side and a rod side, and ports formed in said cylinder at opposite ends for the addition of fluid to and the discharge of fluid from the cylinder, the combination comprising: a first fluid sealing means interposed between said piston and the interior of said cylinder to prevent leakage of fluid, a second fluid sealing means axially spaced from said first fluid sealing means and interposed between said interior of the cylinder and said piston assembly, a relief passage connecting the rod side of said piston assembly with an opening at the surface of said piston in slidable contact with said interior of said cylinder between said first and said second sealing means, a position responsive bypass means operably connecting said relief passage with the pressure fluid acting on the head side of said piston assembly and bypassing said first fluid sealing means when said piston assembly reaches a predetermined position within said cylinder, and a pressure responsive valve means operatively interposed in said relief passage and permitting the flow of fluid when the piston assembly is in said predetermined position within said cylinder and the fluid pressure acting on said rod side exceeds the fluid pressure acting on said head side of said piston assembly.

7. In a pressure fluid motor having a cylinder, a piston slidably engaging the interior wall of said cylinder, a piston rod carried by the assembly and projecting from the end of the cylinder, ports formed in said cylinder at opposite ends for the admission of fluid to and the discharge of fluid from said cylinder, the improvement comprising: a first fluid sealing means interposed between said interior wall and said piston assembly, a second fluid sealing means axially spaced from said first means and interposed between said interior wall and said piston assembly, a relief passage having an opening at one end on the surface of the piston assembly in slidable contact with said interior wall between said first and second fluid sealing means and at the other end an opening to one of said sides of said piston assembly, a bypass means operable to connect said relief passage with the pressure fluid acting on one side of said piston and to bypass one of said fluid sealing means when said piston assembly reaches a predetermined position with respect to said interior wall, and a pressure responsive valve means interposed in said relief passage admitting pressure fluid through said passage when said piston assembly reaches said predetermined position and the fluid pressure on one side of said piston assembly exceeds the pressure of the other side.

8. In a pressure fluid motor having a cylinder, a piston assembly slidably engaging the interior wall of said cylinder, a piston rod carried by the piston assembly and projecting from the end of the cylinder, ports formed in the cylinder at opposite ends for admission of fluid to and the discharge of fluid from said cylinder, the improvement comprising: a first fluid sealing means interposed between said interior wall and said piston assembly, a second fluid sealing means axially spaced from said first fluid sealing means and interposed between said interior wall and said piston assembly, a plurality of flutes extending from one end of said interior wall to a predetermined axial position, a relief passage having an opening at one end on the surface of said piston assembly in slidable contact with said interior wall between said first and second fluid sealing means, the other end of said passage communicating with one of said sides of said piston assembly, and a pressure responsive valve means interposed in said relief passage admitting pressure fluid through said passage when said passage communicates with said flutes and said pressure on one side of said piston assembly exceeds the pressure on the other side.

9. In a pressure fluid motor having a cylinder, a piston slidably engaging the interior wall of said cylinder, a piston rod carried by said piston assembly and projecting from the end of the cylinder, said piston assembly having a rod side and a head side on which the pressure fluid acts, ports formed in said cylinder at opposite ends for admission of fluid to and the discharge of fluid from said cylinder, the improvement comprising: a first fluid sealing means interposed between said interior wall and said piston assembly, a second fluid sealing means axially spaced from said first means and interposed between said interior wall and said piston assembly, said piston assembly having a passage open at one end to one of said sides of said piston assembly and at the other end communicating with said interior wall between said first and second sealing means, a ball check valve interposed in said passage and a position responsive bypass means on said interior wall bypassing said first fluid sealing means and opening said relief passage to the pressure fluid acting upon said one of said sides of the piston assembly when said piston assembly reaches a predetermined position with respect to said interior wall.

10. In a pressure fluid motor having a cylinder, a piston slidably engaging the interior wall of said cylinder, a piston rod carried by said piston assembly and projecting from the end of said cylinder, said piston assembly having a rod side and a head side upon which the pressure fluid acts, ports formed in said cylinder at opposite ends for admission of fluid to and the discharge of fluid from said cylinder, the improvement comprising: a first sealing means interposed between said piston assembly and said interior wall, a second fluid sealing means axially spaced from said first fluid sealing means and interposed between said interior wall and said piston assembly, said piston assembly having an annular passage communicating with said interior wall between said first and said second sealing means and having a portion connecting one of said sides of said piston assembly with said annular passage, and a ball check valve interposed in said portion and adapted to operate when one end of said connecting portion is opened to the pressure fluid acting on said rod side and the other end of said portion is opened to the fluid pressure acting on said head side of said piston assembly, said cylinder having a plurality of flutes extending axially from one end and terminating at a predetermined point on said interior wall to provide a bypass connection for said first fluid sealing means and open said annular passage to the pressure fluid acting upon one of said sides of said piston assembly when said annular passage reaches said predetermined position on the interior wall of said cylinder.

References Cited in the file of this patent
UNITED STATES PATENTS

| | | |
|---|---|---|
| 1,538,167 | Chappell | May 19, 1925 |
| 2,233,521 | Ernst | Apr. 4, 1941 |
| 2,368,628 | Bates | Feb. 6, 1945 |